Jan. 17, 1967   K. R. ALLEN   3,298,893
PREFORMED PLASTIC BLANK FOR MAKING A PLASTIC CONTAINER
Original Filed July 29, 1959   2 Sheets-Sheet 1
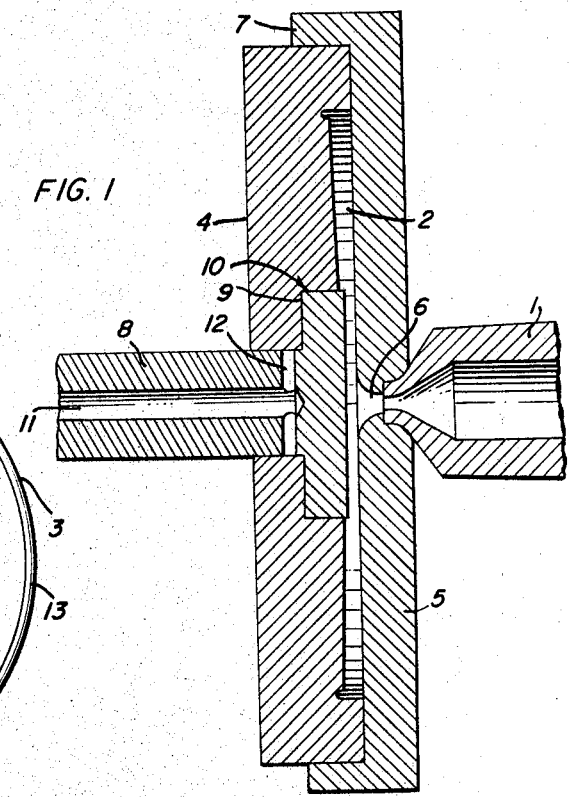
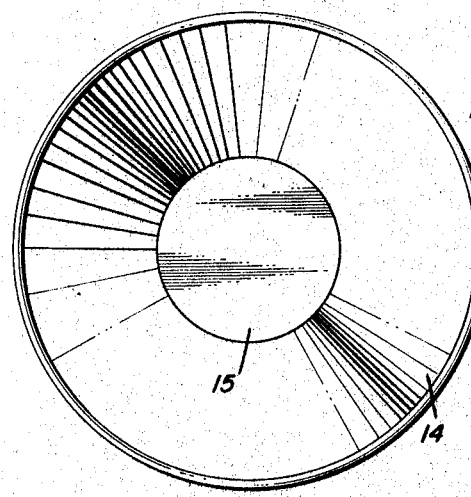
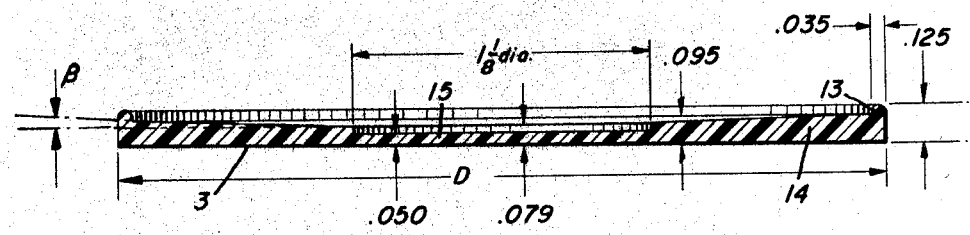
INVENTOR
KENNETH R. ALLEN Jan. 17, 1967 K. R. ALLEN 3,298,893
PREFORMED PLASTIC BLANK FOR MAKING A PLASTIC CONTAINER
Original Filed July 29, 1959 2 Sheets-Sheet 2
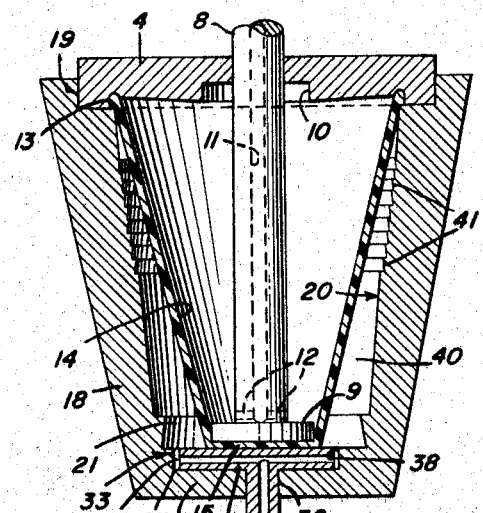
FIG. 4
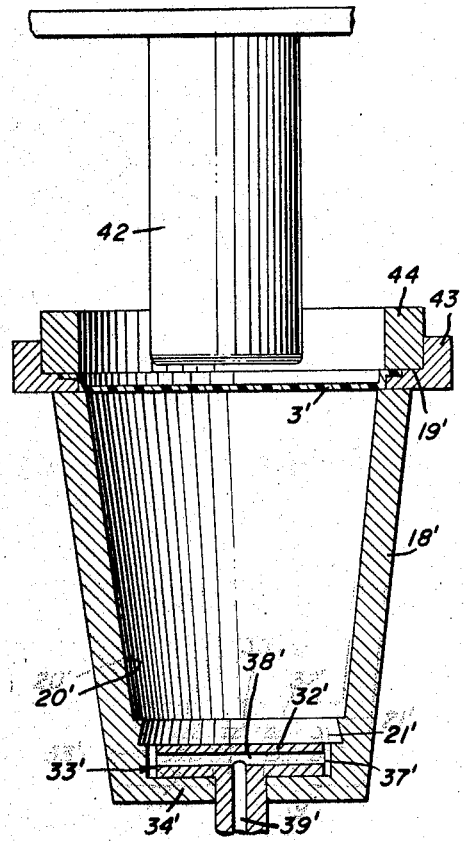
FIG. 6
FIG. 5
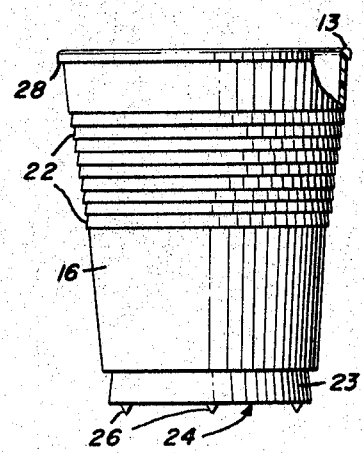
FIG. 7
INVENTOR
KENNETH R. ALLEN

United States Patent Office 3,298,893
Patented Jan. 17, 1967

3,298,893
PREFORMED PLASTIC BLANK FOR MAKING A PLASTIC CONTAINER
Kenneth R. Allen, Wenona, Ill., assignor to Flair Plastics Corporation, Wenona, Ill., a corporation of Delaware
Original application July 29, 1959, Ser. No. 830,229. Divided and this application Apr. 10, 1963, Ser. No. 272,150
3 Claims. (Cl. 161—42)

The present application is a division of my earlier application, Ser. No. 830,229, filed July 29, 1959 and relates to the Preformed Plastic Blank for Making the Plastic Container and the Plastic Container.

This invention relates, in general, to plastic products and the art of producing such products, and has particular relation to an improved plastic container and process, apparatus and blank for producing the same.

While the container which will be described hereinafter in connection with the drawings is a cup for use in coffee and other beverage or other liquid vending machines, it is to be understood that the invention is not limited to such use, but may be employed in all similar work as suitable and desired.

Prior plastic containers and schemes for producing same have been subject to various problems and shortcomings. For example, it has not been possible to obtain as uniform or as thin wall structure as desired, particularly where a plastic sheet made by extruding is blown or vacuum formed to shape. The wall of the finished container has not been as reinforced, and the containers have not been as completely adaptable for use in vending machines as desired.

Moreover, higher injection pressures have been required, and the forming cycle has not been as fast as desired, particularly in conventional injection molding.

According to the present invention, a plastic blank is formed of functionally different parts of different wall thickness by injection molding of the plastic. More particularly, a plastic blank is formed having concentric portions for the rim, the side walls and the bottom wall of the finished container. The rim is relatively heavy and of a cross section and outline of substantially the rim of the finished container. The side wall portion of the preformed blank is of a thickness substantially greater than that of the side wall of the finished container. And more particularly, the bottom wall portion of the blank is of approximately the thickness of the bottom wall of the finished container.

The preformed blank, before it has cooled, or if cooled after the injection molding, after it is reheated, is transferred to the forming mold, and the central part of the blank is depressed by engagement of a plunger therewith to stretch the side walls and thin the same. Then, by pneumatic pressure difference, the stretched, or extended blank is pressed against the inner closed wall of the forming or container mold to the form of the finished container and to chill the plastic and set the same.

Advantages of the invention reside in the production of a container having a heavy reinforcing rim and more uniform and thinner wall structure. Moreover, a lower injection pressure is permitted, and a faster cycle is made possible than with conventional injection molding.

Another advantage is that a finished container is made without any additional operations, such as trimming containers from a sheet which has been vacuum formed to make such containers.

Numerous further advantages and adaptations of the invention will be apparent from the following detailed description taken in connection with the accompanying drawings, it being understood that the invention is limited only within the scope of the appended claims and not to the particular embodiments selected for illustration.

In the drawings:

FIGURE 1 is a fragmentary sectional view illustrating injection mold parts and nozzle for making the plastic blank according to the present invention;

FIGURE 2 is a sectional view taken diagrammatically through the plastic blank formed in the injection mold of FIGURE 1;

FIGURE 3 is a plan view of the blank shown in FIGURE 2;

FIGURE 4 is a sectional view illustrating the mold back of FIGURE 1 applied to a forming mold and the manner in which the central part of the blank is depressed or extended by the plunger;

FIGURE 5 is a side elevational view of the container partially in section, formed by pressing the stretched blank of FIGURE 3 against the wall of the forming mold;

FIGURE 6 is a fragmentary view, partially in section and partially in elevation, showing an alternative structure in which the plunger is not part of the injection mold and ring is employed in transferring the blank to the forming mold; and FIGURE 7 is a fragmentary sectional view illustrating an alternative formation at the upper portion of the side wall of the cup.

Referring now to the drawings, the plastic preferably any thermoplastic plastic, such, for example, as polystyrene, polyethylene, vinyl, nylon, etc., is melted or plasticized in a heating chamber or screw extruder and forced by means of pressure through a runner to a nozzle 1, as shown in FIGURE 1. The plastic then flows through the nozzle 1 into the cavity 2 of the injection mold where the blank shown at 3 in FIGURES 2 and 3 is formed. While any thermoplastic plastic is set forth as preferable, it is to be understood that other plastics, such as thermosetting plastics, may be used within the broader aspects of the present invention.

The cavity 2 is formed in the injection mold back 4, and the injection mold front is shown at 5. The mold front 5 has an opening 6 through which the plastic passes from the nozzle 1 and into the cavity 2. The periphery of the mold front 5 has a flange 7 which fits around the periphery of the mold back 4.

A plunger 8 is disposed axially within the mold back 4. As shown, for example, in FIGURE 1, the plunger 8 has a head or flange 9 which, when the plunger is retracted fits in a correspondingly shaped recess 10 in the mold back 4. The plunger 8 is shown as having an axial bore or hole 11, the holes 12 opening radially from the inner end thereof through which air may be blown into the extended blank of plastic to force the plastic against the container mold as will be hereinafter described.

The injection mold cavity 2 is shaped to give the proper wall distribution to the container when it is completed. The preformed blank 3 is formed in the cavity 2 has functionally different parts of different wall thickness. More particularly, the blank 3 has concentric portions 13, 14 and 15 for the rim, the side walls and the bottom wall respectively of the completed cup or container.

A typical preformed blank is shown in FIGURES 2 and 3. The angle B and diameter D, as indicated in FIGURE 2, may be changed for different containers. Angle B may be 1° and diameter D may be 2.875 inches for a 9 ounce container, as shown in FIGURE 5. The rim portion 13 is heavy and of a cross section and outline of substantially the rim 13 of the finished container. The side wall portion 14 is of a thickness substantially greater than that of the side wall 16 of the finished container. The bottom wall portion 15 is of a thickness substantially less than that of the side wall portion 14, and approximately the thickness of the bottom wall 15 of the finished container.

In FIGURE 2 the rim portion 13 is of a height of about .125 of an inch and of a width of about .035 of an inch. The side wall portion 14 is of a thickness of about .095 of an inch adjacent to the rim 13 and tapers to a thickness of about .079 of an inch adjacent to the outer periphery of the bottom wall portion 15. The bottom wall portion 15 is of a diameter of 1⅛ inch and of a thickness of about .050 of an inch.

Upon completion of the preformed blank, the injection mold back 4 with the preformed blank 3 in the cavity 2 thereof is transferred to position over a forming mold 18, as illustrated in FIGURE 4.

The forming mold 18 is recessed at its upper end 19 to receive the mold back 4, and has a cavity 20 shaped to impart the desired shape to the cup or container. The cavity 20 may have annular ribs 41 to form correspondingly shaped annular ribs 22 on the side wall 16 of the finished container. The lower end of the cavity 20 is of reduced diameter at 21 to form a correspondingly reduced diameter portion 23 at the lower portion of the side wall of the container.

The container illustrated in FIGURE 5 has a diameter of 2⅞ inches at the top of the rim 13 and a diameter of 2 inches at the bottom of the reduced diameter portion 23. The height of this illustrative container embodying the present invention is 3½ inches from the top of the rim 13 to the under surface 24 of the reduced diameter portion 23. The side wall of the reduced diameter portion 23 is shown as tapering upwardly from the bottom surface 24 to a lesser diameter at the bottom of the side wall portion thereabove. The ribs 22 may taper upwardly from their lower ends to lesser diameters at their upper ends.

The bottom surface of the finished cup or container may have three projecting legs, nibs or prongs 26 formed integral therewith and equally spaced circumferentially. These projections 26 insulate the bottom of the cup from the surface of a table, or the like, to prevent injury thereto where, for example, the cup contains hot coffee or other hot liquid.

The bottom of the rim 13 of the cup illustrated in FIGURE 5 forms an annular shoulder as indicated at 28.

In the cup illustrated fragmentarily at 29 in FIGURE 7, the annular shoulder 28' corresponds with the annular shoulder 28 at the bottom of the rim 13 of the cup illustrated in FIGURE 5. In this form of cup there is an annular projection 30 between the upper portion of the rim 13' and the underlying side wall portion of the cup for use in stacking the cups, for example, in a vending machine.

The forming mold 18 has a mold bottom 32 seating in a recess 33 in the bottom wall 34 of the mold 18, and provided with an intergral axial part 35 projecting downwardly through an opening 36 in the bottom wall 34. A small annular gap 37 between the forming mold and the periphery of the mold bottom 32 allows air under the blank to escape where air is blown into the extended blank of plastic to force the plastic against the forming mold. The gap 37 opens out through radial holes 38 and an axial bore or hole 39 in the mold bottom 32.

Where vacuum is applied to the space 40 between the outer periphery of the side wall of the extended blank and the wall of the forming mold, as shown in FIGURE 4, in conjunction with the blowing of air into the interior of the extended blank, or in place of such blowing of air into the extended blank, the vacuum may be applied to the space 40 through the axial bore or hole 39 and the radial holes 38.

After transferring the injection mold back 4, with the preformed plastic blank 3 in the cavity thereof, to the container or forming mold 18, the preformed blank is brought to the form of the finished cup or container as follows:

The preformed blank may be molded into the form of the finished container before it has cooled or solidified after the injection molding of the blank, or it may be cooled after the injection molding, reheated and then formed into the container.

In either case, the plunger 8 is depressed or extended from position with the head 9 in the recess 10 to approximately the position illustrated in FIGURE 4.

The cooperation of the head 9 of the plunger with the central or container bottom wall forming part 15 of the preformed blank, as the plunger is thus extended, mechanically depresses the central part of the blank and stretches or prestretches the side wall portion 14 of the blank generally to extended form, as shown in FIGURE 4. The stretching of the side wall portion 14 of the blank, thins the same, but the bottom wall portion 15 remains approximately the thickness of the bottom wall of the finished container.

Then, by pneumatic pressure difference, the stretched blank is pressed against the inner cold wall of the forming mold 18 to bring the plastic blank to the form of the finished container, and to chill the plastic and set the same.

The pressing of the stretched blank against the inner cold wall of the forming mold 18 may be accomplished by blowing air under pressure into the extended blank through the holes 11 and 12 in the plunger 10, or by applying vacuum to the space 40 through the holes 38 and 39 in the mold bottom 32, or by a combination of the two, i.e., blowing within the extended blank and applying vacuum to the exterior thereof.

The size of the plunger head 9 preferably approximates the size of the bottom of the container, or the bottom wall forming portion 15 of the blank 3, although this may vary within the scope of the present invention.

In the injection molding of the plastic blank, the plastic enters the injection mold at the center of the blank. Since this is the last place to fill in the injection mold, the plastic is hottest at this point. In transferring the injection mold back 4, with the heated blank in the cavity thereof, to the forming mold, and blowing air into the extended blank, the plunger head or flange 9 shields the hot spot in the bottom wall forming portion of the blank, and prevents the air from blowing through such hot spot. The hot bottom wall forming portion 15 of the blank is also protected where vacuum is applied to the outside of the extended blank to press the same against the inner cold wall of the forming mold to bring the plastic to the form of the finished container and to chill the plastic and set the same.

The finished cup or container has a relatively heavy rim 13 which is advantageous, for example, in reinforcing the wall of the container and in dispensing and stacking the containers in a vending machine. The container produced according to the present invention has a more uniform wall than is possible, for example, by blowing or vacuum forming a plastic sheet made by extruding. Thinner wall thickness is possible, and better physical properties are provided. Moreover, a lower injection pressure is permitted, and a faster cycle is possible than by conventional injection molding.

In FIGURE 6 the plunger 42 is not a part of the injection mold. Instead, a ring 43 and clamping ring 44 are employed for transferring the preformed plastic blank 3' to the forming or container mold 18'. The plunger 42 operates similarly to the plunger 8 and the parts of the mold 18' corresponding to parts of the mold 18 are designated by primed (') reference characters corresponding to the reference characters applied to the mold 18.

The embodiments of the invention disclosed in the drawings and specification are for illustrative purposes only, and it is to be expressly understood that said drawings and the specification are not to be construed as a definition of the limits or scope of the invention, reference being had to the appended claims for that purpose.

I claim:
1. A preformed plastic blank for making an open mouth plastic container, said plastic blank having a circular planar central portion for forming the bottom wall of the container, said central bottom wall forming portion of said blank being of approximately the thickness of the bottom wall of the finished container, said plastic blank having an annular side wall forming portion for the container surrounding and integral with the outer periphery of said bottom wall forming portion, said side wall forming portion being of a thickness greater than the thickness of said bottom wall portion to permit stretching and thinning of the side wall portion of the blank to generally cup-shaped form, and a rim portion integral with the outer periphery of said annular side wall forming portion and of a cross section and outline of substantially the rim of the finished container.

2. A preformed plastic blank for making an open mouth plastic container, said plastic blank having a circular planar central portion for forming the bottom wall of the container, said circular planar central portion for forming the bottom wall of the container having smooth parallel upper and lower surfaces, said central bottom wall forming portion of said blank being of approximately the thickness of the bottom wall of the finished container, said plastic blank having an annular side wall forming portion for the container surrounding and integral with the outer periphery of said bottom wall forming portion, said side wall forming portion being of a thickness greater than the thickness of said bottom wall portion to permit stretching and thinning of the side wall portion of the blank to generally cup-shaped form, and a rim portion integral with the outer periphery of said annular side wall forming portion and of a cross section and outline of substantially the rim of the finished container, said side wall forming portion of said blank tapering from a greater thickness adjacent to said rim portion to a lesser thickness adjacent to the outer periphery of the bottom wall forming portion of said blank.

3. A preformed plastic blank for making an open mouth plastic container, said plastic blank having a circular planar central portion for forming the bottom wall of the container, said central bottom wall forming portion of said blank being of approximately the thickness of the bottom wall of the finished container, said plastic blank having an annular side wall forming portion for the container surrounding and integral with the outer periphery of said bottom wall forming portion, said side wall forming portion being of a thickness greater than the thickness of said bottom wall portion to permit stretching and thinning of the side wall portion of the blank to generally cup-shaped form and a rim portion integral with the outer periphery of said annular side wall forming portion and of a cross section and outline of substantially the rim of the finished container, said rim portion being of a monolithic thickness substantially greater than the thickness of the side wall forming portion of the blank.

References Cited by the Examiner

UNITED STATES PATENTS

| | | | |
|---|---|---|---|
| D. 169,400 | 4/1953 | Wales | 273—137 |
| 2,081,777 | 5/1937 | Talalay | 264—90 |
| 2,631,859 | 3/1953 | Ellsworth | 18—5.3 |
| 2,988,258 | 6/1961 | Witzke | 229—1.5 |
| 3,007,377 | 11/1961 | Muller | 229—1.5 |

FOREIGN PATENTS 882,497 6/1943 France.

GEORGE O. RALSTON, *Primary Examiner.*

JOSEPH R. LECLAIR, FRANKLIN T. GARRETT, *Examiners.*

J. F. McNULTY, D. F. NORTON, *Assistant Examiners.*